United States Patent

Saslecov

[11] Patent Number: 6,092,836
[45] Date of Patent: Jul. 25, 2000

[54] DEVICE AND METHOD FOR OCCUPANT PROTECTION IN VEHICLES

[75] Inventor: Venti Saslecov, Göteborg, Sweden

[73] Assignee: AB Volvo, Sweden

[21] Appl. No.: 09/029,389

[22] PCT Filed: Sep. 4, 1996

[86] PCT No.: PCT/SE96/01092

§ 371 Date: May 11, 1998

§ 102(e) Date: May 11, 1998

[87] PCT Pub. No.: WO97/09207

PCT Pub. Date: Mar. 13, 1997

[30] Foreign Application Priority Data

Sep. 4, 1995 [SE] Sweden .................................. 9503037

[51] Int. Cl.[7] .................................................. B60R 21/22
[52] U.S. Cl. ........................................ 280/730.1; 280/732
[58] Field of Search .................................. 280/730.1, 753, 280/732, 751

[56] References Cited

U.S. PATENT DOCUMENTS

| | | | |
|---|---|---|---|
| 2,834,606 | 5/1958 | Bertrand | 280/730.1 |
| 3,514,124 | 5/1970 | Richardson | 280/732 |
| 3,642,303 | 2/1972 | Irish et al. | 280/730.1 |
| 3,768,830 | 10/1973 | Hass | 280/730.1 |
| 4,948,168 | 8/1990 | Adomeit et al. | 280/730.1 |
| 5,312,131 | 5/1994 | Kitagawa et al. | 280/730.2 |

FOREIGN PATENT DOCUMENTS

| | | |
|---|---|---|
| 0 684 164 A1 | 11/1995 | European Pat. Off. . |
| 26 34 222 | 2/1978 | Germany . |
| 39 08 713 A1 | 10/1989 | Germany . |
| 30 29 913 A1 | 4/1990 | Germany . |
| 42 04 280 A1 | 8/1992 | Germany . |
| 42 09 604 A1 | 10/1992 | Germany . |
| 2 263 671 | 8/1993 | United Kingdom . |
| 2 269 790 | 2/1994 | United Kingdom . |

*Primary Examiner*—Kenneth R. Rice
*Attorney, Agent, or Firm*—Lerner, David, Littenberg, Krumholz & Mentlik, LLP

[57] ABSTRACT

Apparatus and methods are disclosed for protecting a passenger in a vehicle including a dashboard. The apparatus includes an airbag disposed in the dashboard at a location such that upon inflation the airbag is disposed in front of the legs and knees of the passenger, a sensor for detecting a condition of the vehicle corresponding to a collision, and for inflating the airbag upon detecting that condition, and a load distributor disposed at a location proximate to the dashboard and juxtaposed with the legs and knees of the passenger whereby upon inflation of the airbag the load distributor and the airbag cooperate to distribute a load with respect to the passenger.

21 Claims, 4 Drawing Sheets

DEVICE AND METHOD FOR OCCUPANT PROTECTION IN VEHICLES

FIELD OF THE INVENTION

The present invention relates to a device for personal protection in a vehicle. More particularly, the present invention relates to a method for personal protection in a vehicle. In particular, the present invention is intended for use in the field of airbags which are used for protection of occupants of motor vehicles.

BACKGROUND OF THE INVENTION

In the field of motor vehicles, inflatable airbags are often used for the protection of occupants in vehicles in the event of a collision or the like. In the case where such an airbag is used to protect the driver of the vehicle, it is normally arranged in the hub of the steering wheel. In the case where it is used to protect a passenger in the passenger seat of the vehicle, it is normally arranged in connection with the upper part of the dashboard and in front of the passenger seat. Should a collision occur, the airbags are activated by inflating them by means of a gas generator.

In the field of motor vehicles, there is also a need to protect body parts other than the head and the upper torso. The technology forming the basis of airbags may then be employed so as to protect for example knees and legs of vehicle occupants. Following this requirement, devices comprising airbags for use as knee protecting devices have been developed. Such a device is previously known, for example, from U.S. Pat. No. 5,312,131, and comprises an airbag module with two airbags which are arranged under the central console of the dashboard, between the driver's seat and the passenger seat. In the event of a collision, one of the airbags will be inflated in a direction towards the driver, whereas the other airbag will be inflated in the direction towards the passenger.

This known device is associated with a problem due to the fact that it is not arranged so as to take into account how the occupant is seated and the size of the occupant. For example, if an occupant has relatively long legs (or if the occupant has positioned the seat in a far forward position), the airbag will not be positioned between the dashboard and the occupant during inflation, which is the desired procedure, but instead the airbag will impinge on the legs of the occupant from the side. This will result in the legs being pushed away in the sidewards direction, which in turn results in the device not providing the desired protection.

A similar device is previously known from British Patent No. 2,263,671, and comprises an essentially flat airbag forming an elongated unit which is arranged under the dashboard and which extends across the legs of the passenger. A problem with this device is that it is mounted on the outside of the dashboard, which is a disadvantageous position as regards the space available in the vehicle. Furthermore, the airbag is inflated in a direction which essentially forms a right angle with the backing support panel, therefore limiting the possibility of absorbing and distributing the force which acts upon the airbag during a collision.

Another problem in connection with airbag systems for the lower parts of the legs and for the knees is that point-shaped loads often arise, for example during penetration of the occupant's knees in such an airbag. Consequently, there is a risk that, for example, the knees of the occupant are pressed too deeply into the airbag during a collision. This makes it difficult to obtain the desired energy-absorbing effect, especially since an airbag for knees and legs is considerably smaller than a conventional airbag for the upper torso of an occupant, which among other things is due to the fact that the distance between an upper torso airbag and the occupant's upper torso is considerably greater than the distance between an occupant's legs and an airbag designed for the legs.

SUMMARY OF THE INVENTION

A main object of the present invention is thus to solve the above-mentioned problems and to provide an improved device which comprises an airbag which can be inflated in an optimum manner as regards protection of the knees, the lower parts of the legs and the feet of occupants in a vehicle, and which can be arranged in an effective manner, as regards the space available, in connection with the dashboard of the vehicle.

In accordance with the present invention, this and other objects have now been realized by the invention of apparatus for for protecting a passenger in a vehicle including a dashboard, the apparatus comprising an air bag disposed in the dashboard at a location whereby upon its inflation the air bag is disposed in front of the legs and knees of the passenger, a sensor for detecting a condition of the vehicle corresponding to a collision, inflation means for inflating the air bag upon detecting said condition by the sensor, and load distribution means disposed at a location proximate to the dashboard and juxtaposed with the legs and knees of the passenger whereby upon inflation of the air bag the load distribution means and the air bag cooperate to distribute a load with respect to the passenger. In accordance with a preferred embodiment, the air bag is disposed at a location whereby upon inflation the air bag expands in a direction substantially parallel to the dashboard and extending substantially longitudinally with respect to the vehicle.

In accordance with one embodiment of the apparatus of the present invention, the air bag is disposed within a substantially enclosed space within the dashboard whereby the air bag inflates within the substantially enclosed space. Preferably, the substantially enclosed space comprises a glove compartment.

In accordance with another embodiment of the apparatus of the present invention, the dashboard includes an elongated opening substantially perpendicular to the longitudinal direction of the vehicle, and wherein upon inflation the air bag expands through the elongated opening. In a preferred embodiment, the dashboard includes a lid covering the elongated opening prior to inflation of the air bag, the lid being adapted to open upon inflation of the air bag. Most preferably, the lid is pivotally mounted on the dashboard.

In accordance with another embodiment of the apparatus of the present invention, the dashboard includes a glove compartment including a glove compartment lid, and wherein the load distribution means comprises at least a portion of the glove compartment lid. In a preferred embodiment, the glove compartment lid comprises a first layer and a second layer, and the first and second layers are selected from the group consisting of plastic and metal.

In accordance with another embodiment of the apparatus of the present invention, the load distribution means is fixedly attached to the air bag, the load distribution means having a first degree of stiffness, the air bag having a second degree of stiffness, the first degree of stiffness being greater than the second degree of stiffness.

In accordance with another embodiment of the apparatus of the present invention, the load distribution means comprises a predetermined portion of the air bag, the predetermined portion of the air bag having a first degree of stiffness, and the remainder of the air bag having a second degree of stiffness, the first degree of stiffness being greater than the second degree of stiffness. Preferably, the predetermined portion of the air bag comprises a woven portion of the air bag. In another embodiment, the predetermined portion of the air bag comprises a plurality of reinforcement fibers woven into a portion of the air bag.

In accordance with the present invention, an apparatus is provided for protecting a passenger in a vehicle including a dashboard having a substantially enclosed space including an openable lid, the apparatus comprising an air bag disposed in the dashboard at a location whereby upon inflation the air bag is disposed in front of the legs and knees of the passenger, a sensor for detecting a condition of the vehicle corresponding to a collision, and inflation means for inflating the air bag upon detecting of the condition by the sensor, the air bag being disposed within the substantially enclosed space prior to inflation thereof. In accordance with one embodiment, the apparatus includes load distribution means associated with the air bag at a location between the air bag and the passenger, the load distribution means having a first degree of stiffness, and the air bag having a second degree of stiffness, the first degree of stiffness being greater than the second degree of stiffness.

In accordance with the present invention, a method has been provided for protecting a passenger in a vehicle including a dashboard and an air bag disposed in the dashboard, the method comprising detecting a condition of the vehicle corresponding to a collision, inflating the air bag upon detecting the condition of the vehicle into a location substantially in front of the legs and knees of the passenger, and disposing load distribution means substantially between the air bag and the passenger whereby the load acting on the air bag by the passenger is absorbed and distributed thereby. In accordance with one embodiment of the method of the present invention, the dashboard includes a substantially enclosed space, and the method includes disposing the air bag within the substantially enclosed space whereby inflation of the air bag takes place within the substantially enclosed space. In accordance with another embodiment of the method of the present invention, the substantially enclosed space includes an openable lid juxtaposed with the passenger.

According to the present invention by using a particular load-distributing element which absorbs and distributes the load acting upon the airbag, improved protection can be provided. The load-distributing element preferably comprises an element forming part of the airbag or the glove compartment of the vehicle. Furthermore, due to the fact that the airbag according to the present invention is arranged behind the dashboard in its inactive condition, advantages as regards the space available in the passenger compartment can be obtained.

In accordance with a particular embodiment of the present invention, the airbag is adapted so that, when activated, it is inflated inside a space provided in connection with the dashboard. Preferably, this space comprises the glove compartment. According to this embodiment, the energy-absorbing airbag will be positioned between the door of the glove compartment and the dashboard behind it. The door of the glove compartment constitutes a load-distributing element, whereas the energy absorption takes place in the inflated airbag inside the glove compartment. Consequently, the backing dashboard forms a support.

Due to the fact that the airbag, in its inactive condition, is arranged as an elongated unit which is arranged essentially perpendicular to the longidudinal direction of the vehicle, only small packing dimensions will be required in a section of the vehicle which otherwise offers very little available space.

According to a further embodiment, the present invention comprises a lid which is folded down in the car when the airbag is activated. This results in a minimal risk of leg injuries for the passenger.

According to a further embodiment, the present invention comprises an airbag which is supported inside the lid of the glove compartment. In this regard, the airbag is designed with a special load-distributing element which is adapted so that it will be positioned between the airbag and an occupant in the vehicle when the airbag is activated. By means of this load-distributing element, the load acting on the airbag during, for example, a collision can be absorbed. In particular, the impact area is stiffened where for example the occupant's knees impact the airbag, whereby the load which acts on the airbag can be absorbed and distributed. The point-shaped loads which arise following penetration of, for example, the occupant's knees in the airbag can thus be distributed in an effective manner. This results in improved protection for the passenger.

The basic principle of the present invention is that energy absorption takes place in the airbag. In the case where the airbag is inflated inside the glove compartment, the lid constitutes a load-distributing element. In the case where the airbag is inflated to a position outside the glove compartment, an alternative load-distributing element is provided, which element is arranged in connection with, or is integrated with, the airbag. In the case where the airbag is positioned between a passenger and the dashboard, the dashboard acts as a load-distributing backing for the airbag.

BRIEF DESCRIPTION OF THE DRAWINGS

The present invention will be described in greater detail in the following detailed description, with reference to the annexed drawings, in which.

DETAILED DESCRIPTION

Figure 1:
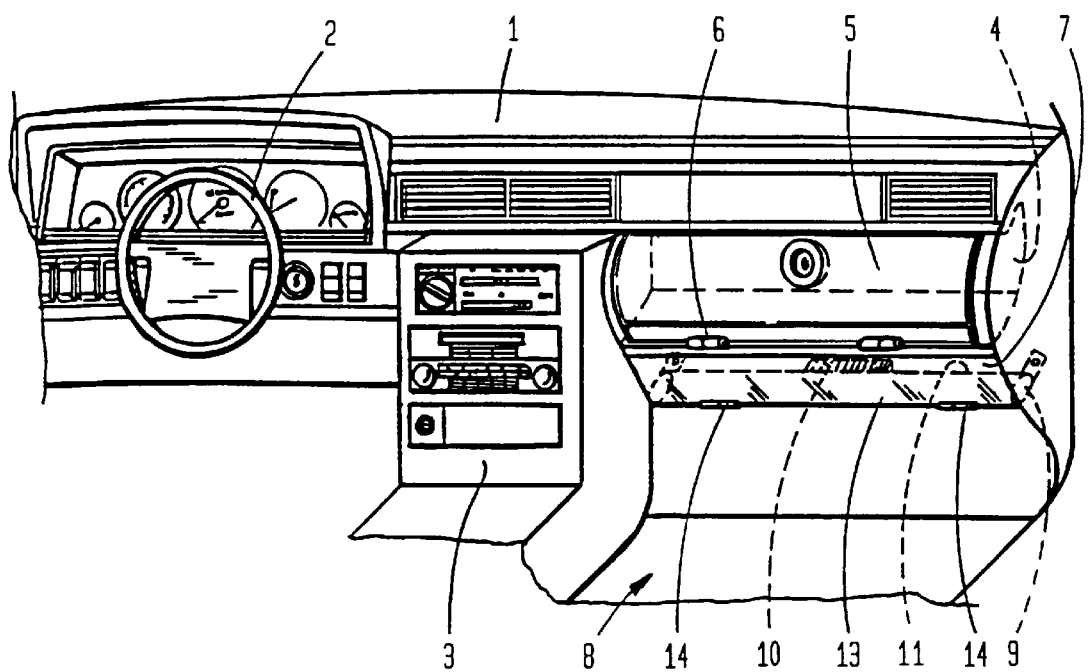
FIG. 1 is a front, perspective view showing a vehicle passenger compartment provided with an airbag arrangement in accordance with the present invention, which airbag arrangement is in its non-inflated state.

Referring to the Drawings, FIG. 1 shows a perspective view of a vehicle passenger compartment provided with an airbag arrangement in accordance with the present invention. In the compartment a dashboard 1, a steering wheel 2 and a center console 3 are provided in a conventional manner.

On the passenger side of the compartment, a is glove compartment 4 provided with an openable lid 5 is arranged. Preferably, the lid 5 has a rounded shape and can be opened by pivoting it about an axis which is defined by a hinge device 6 along the lower edge of the lid 5. The lid 5 transforms into a lower panel 7 of the dashboard 1. The lower panel 7 transforms in turn into the section of the vehicle body which forms the floor 8 of the vehicle. Furthermore, the dashboard 1 is preferably arranged so that the lid 5 is positioned directly in front of the position in which a passenger normally places his knees.

The glove compartment 4, the lid 5 and the lower panel 7 extend in the sidewards direction from the center console 3 to the edge of the dashboard 1 which is adjacent to the vehicle door (not shown) on the passenger side.

An airbag 9 is arranged on the reverse side of the lower panel 7, preferably in a space arranged just below the lid 5 of the glove compartment 4. In the inactive condition of the airbag 9 (i.e. in its non-inflated condition), it has an elongated disposition which is essentially perpendicular to the longitudinal direction of the vehicle. FIG. 1 shows the airbag 9 in this condition. The airbag 9 is of a conventional kind, and is therefore not described in detail.

An inflation device is arranged in connection with the airbag 9, which device is preferably in the form of a gas generator 10 which is adapted for inflating the airbag 9 should a collision occur. To this end, the gas generator 10 is connected to an acceleration sensor (not shown) which in a known manner is adapted to detect whether a particularly high retardation occurs. If this is the case, the acceleration sensor emits a signal to the gas generator 10, which in turn will be activated so as to inflate the airbag 9.

The airbag 9 is mounted in an essentially elongated support bracket 11 which in turn is fixed in the vehicle on the reverse side of the dashboard 1, preferably behind the lower panel 7. The gas generator 10 is also mounted on the support bracket 11.

Figure 2:
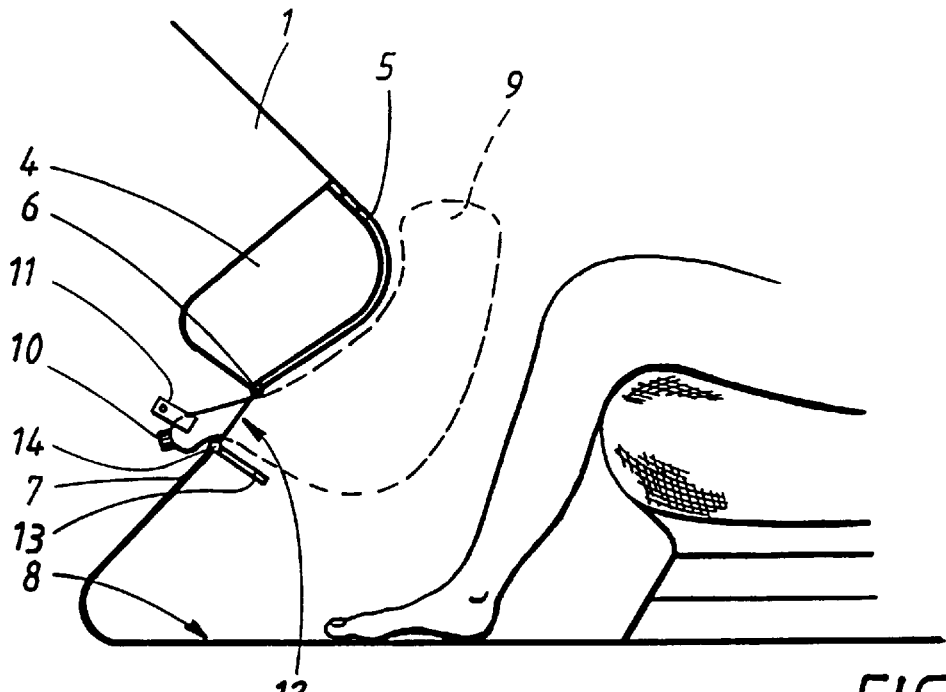
FIG. 2 is a side, elevational view showing the airbag arrangement of the present invention according to a first embodiment.

In accordance with FIG. 2, the airbag 9 is arranged behind an opening 12 in the lower panel 7. This opening 12 is covered by an elongated lid 13 which is pivotally mounted by means of hinges 14 in the lower edge of the lid 13. This means that when the airbag 9 is activated, it will influence the lid 13 outwardly due to the pressure inside the airbag, so as to swing the lid 13 about the hinges 14, thereby opening it. This results in the airbag 9 being forced out into the vehicle passenger compartment, in front of the legs of the passenger. For the purpose of forcing out the airbag 9 in an optimum manner, the airbag 9 and the gas generator 10 are preferably arranged in a slightly inclined manner, i.e. so that the airbag 9 during its inflation is "directed" essentially parallel to the lower parts of the passenger's legs.

FIG. 2 shows the device according to this first embodiment of the present invention, the airbag 9 being in its activated, inflated condition.

Although the airbag 9 is essentially of a conventional type, it is adapted as regards the shape and sewing thereof to the space which is formed in front of the legs and knees of the passenger, i.e. the space in front of the glove compartment 4 and the lower panel 7. Furthermore, the airbag 9 extends laterally in a direction which essentially corresponds to the width of the lower panel 7 (see also FIG. 1). In this manner, effective protection can be obtained. Preferably, the airbag 9 has a volume of approximately 10–20 liters.

When the legs of the occupant hit the inflated airbag 9 during a collision, a high force is exerted upon the airbag 9. The gas inside the airbag 9 contributes to energy absorption, i.e. said force from the occupant's body will be absorbed. In order to further improve this force-absorbing and load-distributing effect of the invention, the dashboard 1 is arranged so that a certain part of its surface constitutes a load-distributing element in the form of a surface which is arranged essentially directly in front of the legs of the occupant. In the event of a collision, the force acting upon the airbag 9 will be transferred to this surface, whereby the force will be absorbed and distributed along the surface. In this manner, the impact on the occupant can be reduced. Preferably, this load-distributing element is formed by the lid 5 of the glove compartment 4. According to the invention, the lid 5 is thus positioned essentially directly in front of the knees and lower parts of the legs of the occupant, i.e. at the position which is exposed to a high impact in the event of a collision. In this manner, the "built-in" flexibility of the lid 5 of the glove compartment 4 can be used to even out the impact on the exposed body parts of the occupant.

In order to obtain a significant distribution of the load, the lid 5 can be manufactured from a particularly selected material. For example, the lid 5 can be manufactured from a layer of ABS plastic, metal sheet, aluminium sheet or similar material having a certain elasticity as regards impact absorption. In order to further improve its properties, the lid 5 can be manufactured from a sandwich design which can comprise several material layers (for example three or more) which can be arranged according to the sequence plastic/metal/plastic.

When the airbag 9 is inflated, it is forced out of the opening 12 and is formed so as to be positioned between the door 5 and the legs of the occupant. During inflation, the airbag 9 is developed in a direction which is inclined slightly upwards and rearwards, i.e. essentially parallel to the normal direction of an occupant's legs. In this manner, the airbag 9 will always be situated between the lid 5 and the legs of the occupant in a collision, even if the occupant has placed his legs in a far advanced position. The direction of expansion of the airbag preferably forms an angle of 20–70° in relation to the longitudinal direction of the vehicle.

It is not necessary to provide a glove compartment 4 with a lid 5 in order to maintain an impact absorbing element. In vehicles lacking a glove compartment or in which a glove compartment is provided elsewhere in the vehicle, the dashboard may include an outer wall which comprises a particular section forming said impact-absorbing element.

Figure 3:
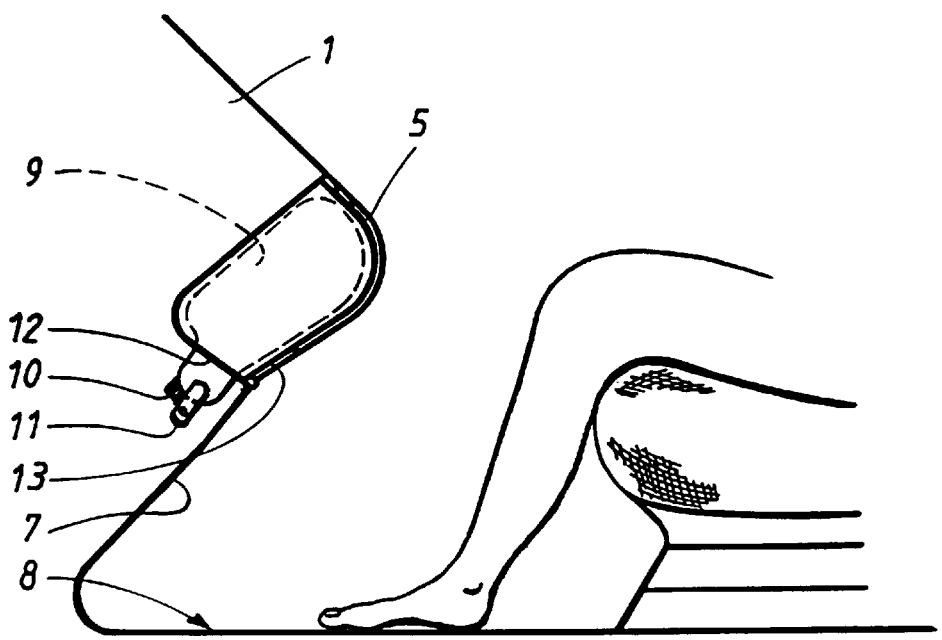
FIG. 3 is a side, elevational view showing the airbag arrangement of the present invention according to a second embodiment.

FIG. 3 shows an alternative embodiment of the present invention. According to this embodiment, the airbag 9 is positioned at essentially the same position as has been described above with reference to FIGS. 1 and 2. However, in this case the airbag 9 is directed towards an opening 15 facing the inside of the glove compartment 4. In this manner, the airbag 9 will be inflated inside the glove compartment 4 when activated. When the airbag 9 is activated, it will exert a force against a lid 13 so as to open it, whereby the lid 13 is pivotally arranged by means of hinges 14. Alternatively, the airbag 9 according to this embodiment can be arranged in the bottom of the glove compartment 4.

This alternative embodiment is also based on the fact that the airbag 9 cooperates with an impact-absorbing element which preferably comprises the lid 5 itself of the glove compartment 4. Should a collision occur, the legs of the occupant will be forced in the forwards direction and hit the lid 5, whereby the force from the occupant will be distributed via the lid 5 and further on to the airbag 9. If the lid 5 is designed with suitable dimensions and from suitable materials, the impact from the occupant's legs can be distributed by means of the lid 5 and the airbag 9.

Preferably, the airbag is designed with a plurality of ventilation holes (not shown) assuring that the pressure in the airbag 9 is released with an even flow when a force is applied to the lid 5, which in turn distributes the load along the airbag 9.

Figure 4:
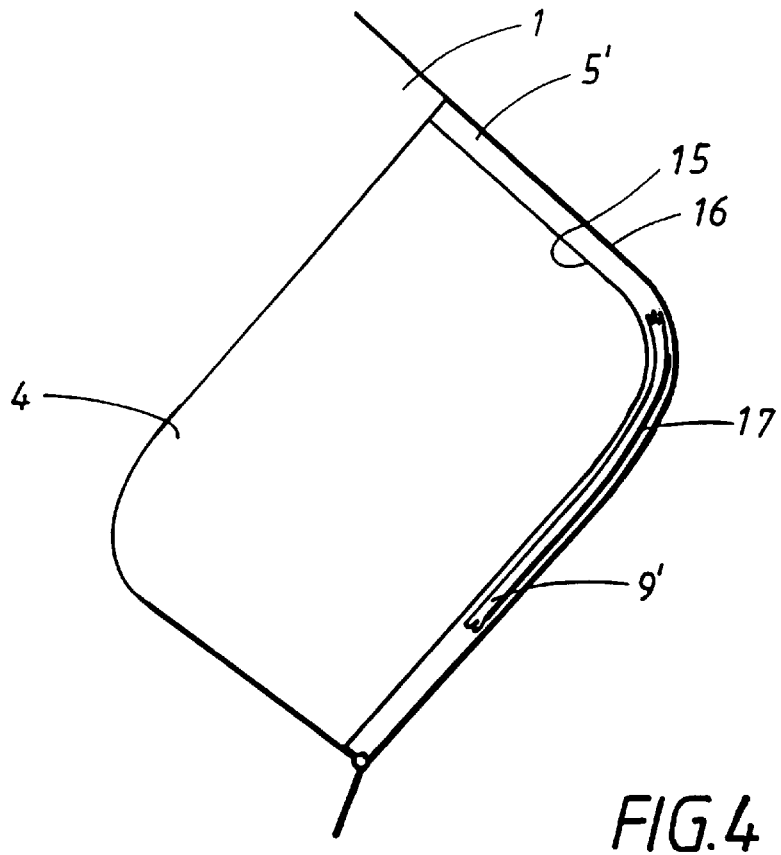
FIG. 4 is a side, elevational, cross-sectional view through a glove compartment according to a third embodiment of the invention.
Figure 5:
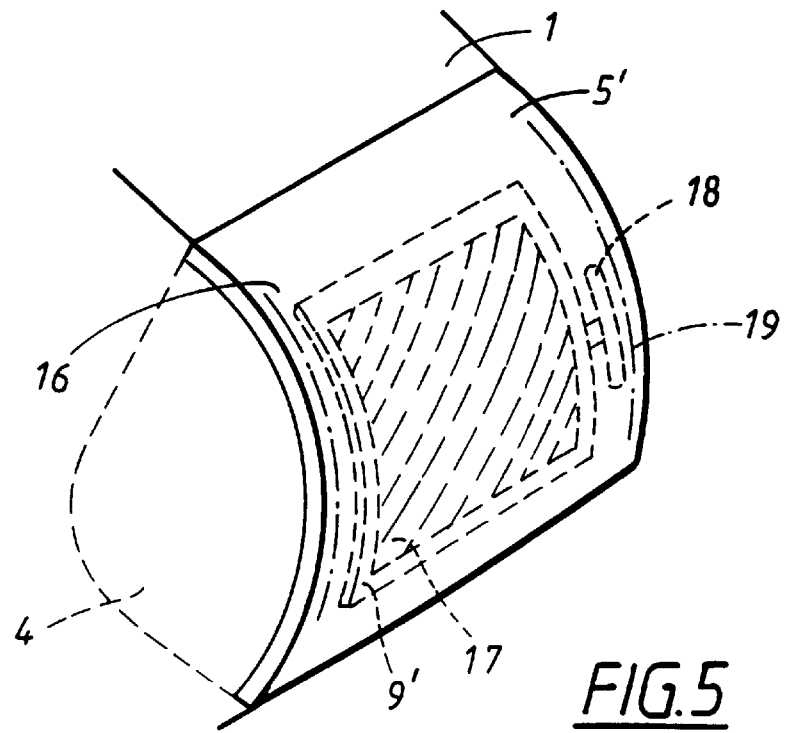
FIG. 5 is a front, perspective view of the door of the glove compartment according to the embodiment shown in FIG. 4.
Figure 6:
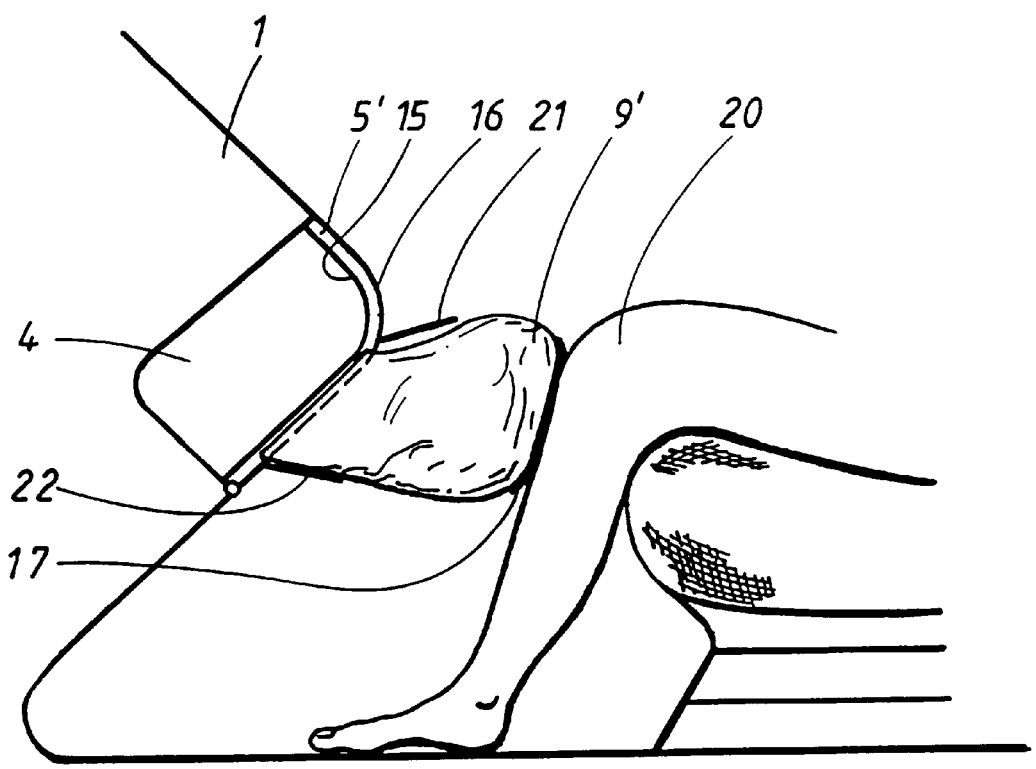
FIG. 6 is a side, elevational view showing the present invention in its active position, according to the embodiment shown in FIGS. 4 and 5.

An additional embodiment of the present invention is shown in FIGS. 4, 5 and 6. These figures also show the principle of a load-distributing element which can absorb and distribute the impact acting on an airbag during a collision. FIG. 4 shows a cross-section through a dashboard 1 with a glove compartment comprising a lid 51. According to this embodiment, the lid 5' is designed so as to support and accommodate an airbag 9'. To this end, the lid 5' comprises a base panel 15 and a front panel 16, wherein the base panel 15 is designed so as to be stronger than the front panel 16. Between these panels, 15 and 16, a space is formed, which consequently accommodates the airbag 9'.

In its inactive condition, the airbag 9' is folded so that it assumes a thin and essentially sheet-like shape having dimensions, as regards its height and width, which correspond to the assumed position of the lower parts of the legs and the knees of an occupant in the vehicle. Since an airbag for the present field of use can be manufactured with a relatively small volume, e.g., approximately 20–25 liters, it can be folded to a relatively small size, i.e. so as to accommodate it within the lid 5'.

The airbag 9' is provided with a load-distributing element 17 which is arranged to be positioned between the airbag 9' and the occupant in the vehicle when the airbag 9' is activated. The load-distributing element 17 differs from the load-distributing element 5 described above as regards the fact that it constitutes a part of the airbag 9' rather than a part of the dashboard of the vehicle (cf. FIG. 3).

The load-distributing element 17 according to FIG. 4 can be designed in many different ways, for example as a sheet-shaped element of relatively stiff material, for example synthetic material, woven glass fiber or composite material, which can be bonded to the airbag 9' by means of, for example, glueing. Alternatively, the load-distributing element 17 can be provided by forming the front side of the airbag 9' in a more stiff manner than the rest of the airbag 9', for example by suitable weaving of the material in the airbag 9'. A third way of obtaining the stiffening of the load-distributing element 17 between the airbag 9' and the occupant is to weave in reinforcement material, for example in the form of threads of Kevlar or corresponding material, in selected parts of the web forming the airbag 9'. Consequently, the load-distributing element 17 can be said to form a part of the airbag 9', either in the form of an element which is fixed to the airbag 9' or in the form of a predetermined section of the airbag 9' which is designed so as to provide the load-distributing properties.

FIG. 5 shows a perspective view of the embodiment according to FIG. 4, illustrating the position of the airbag 9' and the load-distributing element 17. FIG. 5 also illustrates schematically a gas generator 18 associated with the airbag 9'. In a known manner, the gas generator 18 can be used for inflating the airbag 9'. The position and dimensions of the airbag 9' and the load-distributing element 17 can be varied in accordance with the prevailing use and need not necessarily be the same as that shown in FIGS. 4 and 5. However, the basic principle is that the load-distributing element 17 should distribute the load which is exerted by the legs of the occupant in the event of a collision.

The front panel 16 of the lid 5' is preferably designed with rupture markings 19 (which are denoted by means of dash dotted lines in FIG. 5), i.e. weakened sections in the front panel 16. These rupture markings 19 are preferably designed in the form of the letter "H" and define an opening through which the airbag 9' can be inflated and expand when activated.

FIG. 6 shows the device according to FIGS. 4 and 5 in an active condition, i.e. a condition in which the airbag 9' is inflated. FIG. 6 also shows the legs 20 of an occupant. The drawing illustrates that the airbag 9' has assumed an inflated condition, wherein the front panel 16 of the glove compartment door 5' has been torn at the above-mentioned rupture markings to form two flaps, 21 and 22, between which the airbag 9' has been inflated. In accordance with the above, the load-distributing element 17 is adapted as regards its position on the airbag 9' so that the point-shaped load arising as a consequence of the knees of the occupant 20 penetrating the airbag 9' can be absorbed and distributed along the surface of the airbag 9'. This in turn provides improved protection for the occupant 20.

The airbags according to the above-mentioned embodiments can be provided with means for controlling the expansion thereof. For example, said means can comprise a tearable textile, i.e. a textile element which for example is sewn onto the base panel 15 (see FIG. 4) of the lid 5' and the front side of the airbag 9'. The tearable textile constitutes a resistance which controls the desired direction of the airbag. Alternatively, said means can constitute so-called trap bands which embrace the airbag at certain positions and which restrain it from further expansion above a certain limit. A third alternative is tearable seams, by means of which the airbag can be expanded in accordance with a desired progression.

The present invention is not limited to the above-mentioned embodiments shown in the drawings, but may be varied within the scope of the subsequent claims. For example, different materials can be used for the load-distributing element, i.e. the lid 5. Furthermore, the energy-absorption of the airbag 9 can also be affected by means of, for example, ventilation holes or by means of the gas flow and the permeability of the airbag 9.

The device according to the present invention, i.e. according to any one of the above-mentioned embodiments, can use an existing acceleration sensor which can be provided in the vehicle for use together with a conventional airbag for the upper torso. Alternatively, the invention can be assigned to a separate acceleration sensor.

In the case where the vehicle is provided with several different airbag systems, it may also comprise a computer-based control unit which can be adapted for coordinating the timing during activation of the different airbags.

Furthermore, the lid 13 can be designed in different ways, and can also be in the form of a curtain, for example of textile, which will be torn by the airbag during expansion thereof.

The present invention can also be arranged in connection with a sensor for detecting whether a passenger sits in the seat. In this manner, the airbag according to the present invention can be arranged so as to be enabled to be inflated only in the case where somebody is sitting in the seat.

According to an alternative of the embodiment shown in FIGS. 4, 5 and 6, the airbag 9' can comprise a conventional airbag, i.e. without any load-distributing element.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for protecting a passenger in a vehicle including a dashboard, said apparatus comprising an air bag disposed within a substantially enclosed space within said dashboard, said substantially enclosed space comprising a glove compartment, whereby said air bag is inflatable within said substantially enclosed space so that upon its inflation said air bag is to be disposed in front of the legs and knees of said passenger, a sensor for detecting a condition of said vehicle corresponding to a collision, inflation means for inflating said air bag upon detecting of said condition by said sensor, and load distribution means disposed at a location proximate to said dashboard dan juxtaposed with said legs and knees of said passenger whereby upon inflation of said air bag said load distribution means and said air bag cooperate to distribute a load with respect to said passenger.

2. The apparatus of claim 1, wherein said air bag is expandable in a direction substantially parallel to said dashboard and extending substantially longitudinally with respect to said vehicle.

3. The apparatus as claimed in claim 1, wherein said glove compartment includes a glove compartment lid, and wherein said load distribution means comprises at least a portion of said glove compartment lid.

4. The apparatus as claimed in claim 3, where in said glove compartment lid comprises a first layer and a second layer, and wherein said first and second layers are selected from the group consisting of plastic and metal.

5. Apparatus for protecting a passenger in a vehicle including a dashboard having a glove compartment with a glove compartment lid, said apparatus comprising an air bag disposed in said dashboard in front of the legs and knees of said passenger, a sensor for detecting a condition of said vehicle corresponding to a collision, inflation means for inflating said air bag upon detecting of said condition by said sensor, and load distribution means juxtaposed with said legs and knees of said passenger, said load distribution means comprising at least a portion of said glove compartment lid whereby upon inflation of said air bag said load distribution means and said air bag cooperate to distribute a load with respect to said passenger.

6. The apparatus as claimed in claim 5, wherein said air bag is expandable in a direction substantially parallel to said dashboard and extending substantially longitudinally with respect to said vehicle.

7. The apparatus as claimed in claim 5, wherein said dashboard includes an elongated opening substantially perpendicular to the longitudinal direction of said vehicle, and wherein upon inflation said air bag expands through said elongated opening.

8. The apparatus as claimed in claim 7 wherein said dashboard includes a lid covering said elongated opening prior to inflation of said air bag, said lid being adapted to open upon inflation of said air bag.

9. The apparatus as claimed in claim 8, wherein said lid is pivotally mounted on said dashboard.

10. The apparatus as claimed in claim 5, where in said glove compartment lid comprises a first, layer and a second layer, and wherein said first and second layers are selected from the group consisting of plastic and metal.

11. Apparatus for protecting a passenger in a vehicle including a dashboard, said apparatus comprising an air bag disposed in said dashboard at a location whereby upon its inflation said air bag is disposed in front of the legs and knees of said passenger, a sensor for detecting a condition of said vehicle corresponding to a collision, inflation means for inflating said air bag upon detecting of said condition by said sensor, and load distribution means disposed at a location proximate to said dashboard and juxtaposed with said legs and knees of said passenger whereby upon inflation of said air bag said load distribution means and said air bag cooperate to distribute a load with respect to said passenger, wherein said load distribution means comprises a predetermined portion of said air bag, said predetermined portion of said air bag having a first degree of stiffness, and said remainder of said air bag having a second degree of stiffness, said first degree of stiffness being greater than said second degree of stiffness.

12. The apparatus as claimed in claim 11, wherein said air bag is expandable in a direction that is substantially parallel to said dashboard and extending substantially longitudinally with respect to said vehicle.

13. The apparatus as claimed in claim 11, wherein said load distribution means is fixedly attached to said air bag.

14. The apparatus as claimed in claim 11, wherein said predetermined portion of said air bag comprises a woven portion of said air bag.

15. The apparatus as claimed in claim 11, wherein said predetermined portion of said air bag comprises a plurality of reinforcement fibers woven into a portion of said air bag.

16. Apparatus for protecting a passenger in a vehicle including a dashboard having a substantially enclosed space including an openable lid, said dashboard including a glove compartment including a glove compartment lid, said apparatus comprising an air bag disposed in said dashboard at a location whereby upon inflation said air bag is disposed in front of the legs and knees of said passenger, a sensor for detecting a condition of said vehicle corresponding to a collision, inflation means for inflating said air bag upon detecting of said condition by said sensor, said air bag being disposed within said substantially enclosed space prior to inflation thereof and load distribution means disposed at a location proximate to said dashboard and juxtaposed with said legs and knees of said passenger wherein said load distribution means comprises at least a portion of said glove compartment lid.

17. The apparatus of claim 16, said load distribution means having a first degree of stiffness, and said air bag having a second degree of stiffness, said first degree of stiffness being greater than said second degree of stiffness.

18. A method for protecting a passenger in a vehicle including a dashboard and an air bag, said method comprising disposing said air bag within a substantially enclosed space within said dashboard, said enclosed space comprising a glove compartment, detecting a condition of said vehicle corresponding to a collision, inflating said air bag within said enclosed space upon detecting said condition of said vehicle into a location substantially in front of the legs and knees of said passenger, and disposing load distribution means substantially between said air bag and said passenger whereby the load acting on said air bag by said passenger is absorbed and distributed thereby.

19. The method of claim 18 wherein inflation of said air bag takes place within said substantially enclosed space.

20. A method for protecting a passenger in a vehicle including a dashboard and an air bag disposed in said dashboard, said method comprising detecting a condition of said vehicle corresponding to a collision, inflating said air bag upon detecting said condition of said vehicle into a location substantially in front of the legs and knees of said passenger, and disposing load distribution means substantially between said air bag and said passenger whereby the load acting on said air bag by said passenger is absorbed and distributed thereby, wherein said load distribution means comprises a predetermined portion of said air bag, said predetermined portion of said air bag having a first degree of stiffness, and said remainder of said air bag having a second degree of stiffness, said first degree of stiffness being greater than said second degree of stiffness.

21. The method of claim 20 wherein said substantially enclosed space includes an openable lid juxtaposed with said passenger.

* * * * *

UNITED STATES PATENT AND TRADEMARK OFFICE
CERTIFICATE OF CORRECTION

PATENT NO. : 6,092,836
DATED : July 25, 2000
INVENTOR(S) : Saslecov

It is certified that error appears in the above-identified patent and that said Letters Patent is hereby corrected as shown below:

Col. 5, line 1, delete "is".

Col. 9, line 18, "dan" should read --and--.

Col. 9, line 30, "where in" should read --wherein--.

Col. 9, line 62, "where in" should read --wherein--.

Col. 9, line 63, after "first" delete --,--.

Signed and Sealed this

Twenty-fourth Day of April, 2001

NICHOLAS P. GODICI

*Attest:*

*Attesting Officer*

*Acting Director of the United States Patent and Trademark Office*